United States Patent [19]

Kahn et al.

[11] Patent Number: 5,007,106
[45] Date of Patent: Apr. 9, 1991

[54] OPTICAL HOMODYNE RECEIVER

[75] Inventors: Joseph M. Kahn, Red Bank, N.J.; Bryon L. Kasper, Allentown, Pa.

[73] Assignee: AT&T Bell Laboratories, Murray Hill, N.J.

[21] Appl. No.: 433,632

[22] Filed: Nov. 8, 1989

[51] Int. Cl.[5] .............................................. H04B 10/06
[52] U.S. Cl. ................................................... 455/619
[58] Field of Search ................ 455/615, 616, 617, 619

[56] References Cited

U.S. PATENT DOCUMENTS 4,868,896  9/1989  Pietzsch ............................. 455/619

FOREIGN PATENT DOCUMENTS 0241039  10/1987  European Pat. Off. ............ 455/616
8607513  12/1986  PCT Int'l Appl. ................... 455/616

OTHER PUBLICATIONS

J. M. Kahn et al., "Optical Phaselock Receiver with Multigigahertz Signal Bandwidth", Elec. Lett., vol. 25, No. 10, May 11, 1989, pp. 626–628.
J. M. Kahn, "1 Gbit/s PSK Homodyne Transmission System Using Phase-Locked Semiconductor Lasers", IEEE Photonics Tech. Lett., vol. 1, No. 10, Oct. 1989 pp. 340–342.
L. G. Kazovsky, "Balanced Phase-Locked Loops for Optical Homodyne Receivers: Performance Analysis, Design Considerations, and Laser Linewidth Require-ments", J. Lightwave Tech., vol. LT-4, No. 2, Feb. 1986, pp. 182–195.
D. J. Malyon, "Digital Fibre Transmission Using Optical Homodyne Detection," Elec. Lett., Vol. 20, No. 7, Mar. 29, 1984, pp. 281–283.
D. J. Maylon, et al., "Semiconductor Laser Homodyne Optical Phase-Locked-Loop", Elec. Lett., vol. 22, No. 8, Apr. 10, 1986, pp. 421–422.

Primary Examiner—Reinhard J. Eisenzopf
Assistant Examiner—L. Van Beek

[57] ABSTRACT

An optical homodyne receiver is realized by employing two separate signal amplification paths in a balanced receiver configuration. Specifically, the relative phase difference between a received optical signal and a local oscillator signal is extracted from nodes which, from the point of view of an amplifier extracting a data component signal, are at ac ground. This approach permits a phase detector amplifier, which extracts the relative phase component, to be dc coupled in addition to having a higher transimpedance for lower thermal noise, and thus higher sensitivity. Additionally, by extracting the data and phase component signals at different points in a balanced receiver configuration, the data and phase amplifiers can be separately engineered for optimum performance.

16 Claims, 4 Drawing Sheets

OPTICAL HOMODYNE RECEIVER

TECHNICAL FIELD

This invention relates to optical receivers and, more particularly, to those which employ homodyne detection of optical signals.

BACKGROUND OF THE INVENTION

Coherent detection of optical signals offers a number of advantages with respect to the conventional technique of intensity modulation/direct detection. For example, coherent detection can offer ~ 10 to 20 dB improvement in receiver sensitivity while permitting alternative modulation formats, such as frequency-shift keying (FSK) and phase-shift keying (PSK). Particularly, these alternative modulation formats are important since direct intensity modulation of semiconductor lasers leads to chirp, which limits transmission distances through a fiber.

Homodyne detection offers practical advantages, such as minimum required receiver bandwidth, reduced receiver thermal noise and fully linear signal processing, which facilitate the attainment of near-quantum-limited sensitivity at high bit-rates. Also, multi-channel homodyne systems may employ a higher channel-packing density than their heterodyne counterparts. In theory, homodyne detection of phase-shift keyed optical signals has been shown to offer the best receiver sensitivity among all the binary signaling techniques employing single-bit decisions. However, implementation of BPSK homodyne receivers has not been straightforward because of the difficulty in phase-locking a local oscillator signal to a received optical signal that contains BPSK modulated data.

It is well known that phase-locking can be achieved either by means of a phase-locked loop or through injection locking. Due to the prohibitively high signal power levels required for injection-locking, utilizing a phase-locked loop has become the design of choice. Due to its ease of implementation, most phase-locked loop receivers employ a linear loop configuration with pilot-carrier BPSK, as opposed to a nonlinear loop (decision-driven loop or Costas loop) with suppressed-carrier BPSK.

The advantages of homodyne detection are especially important at multigigabit-per-second data rates. For application to linear optical phase-locked loops, however, present homodyne receivers have difficulties in providing a low-noise, dc-coupled phase error signal while amplifying multigigabit-per second data signals.

SUMMARY OF THE INVENTION

An optical homodyne receiver overcoming the drawbacks of the prior art is realized by employing two separate signal amplification paths in a balanced receiver configuration. Specifically, the relative phase difference, i.e., phase error signal, between a received pilot-carrier signal and a local oscillator signal is extracted from nodes which, from the point of view of an amplifier extracting a data component signal, are at ac ground. This approach permits a phase detector amplifier, which extracts the relative phase component, to be dc coupled in addition to having a higher transimpedance for lower thermal noise, and thus, higher sensitivity. Moreover, this approach allows the phase detector amplifier to employ transistors having low 1/f noise, unlike transistors which are utilized for extracting and amplifying the data component signal.

In one exemplary embodiment, the input of a transimpedance data amplifier is connected between two high-speed photodiodes connected in series for extracting the data component signal of a received binary phase-shift keyed optical signal incident on the photodiodes. Furthermore, a phase detector amplifier simultaneously extracts the relative phase component from the opposing ends of each photodiode.

In accordance with the principles of the invention, by extracting the relative phase and data component signals at different points in a balanced receiver configuration, the data and phase amplifiers can be separately engineered for optimum performance.

BRIEF DESCRIPTION OF THE DRAWING

A more complete understanding of the invention may be obtained by reading the following detailed description in conjunction with the drawings wherein.

DETAILED DESCRIPTION

An optical receiver for homodyne detection of pilot carrier binary-phase-shift-keyed (BPSK) optical signals is realized by employing two signal amplification paths in a balanced receiver configuration, which allows the separate engineering of the electronic amplifiers for data and phase detection. Specifically, this approach allows the detector amplifier extracting the relative phase difference between a received pilot-carrier signal and a local oscillator signal to be dc coupled to have higher transimpedance for lower thermal noise and to employ transistors that have low 1/f noise. However before describing the inventive optical receiver, it will be instructive to discuss briefly the operating principles of "coherent" detection, specifically homodyne detection of BPSK.

Detection techniques for "coherent" optical communications systems involve the photoconductive mixing of an optical signal from a strong local oscillator with a weaker received optical signal, which may be amplitude-, frequency-, or phase-modulated. Photoconductive mixing effectively amplifies the weaker received optical signal and, moreover, down-converts the signal to either an intermediate frequency (heterodyne) or directly to the baseband domain (homodyne). A salient attribute of "coherent" detection is that when the local oscillator power becomes sufficiently large, the signal-to-noise ratio approaches a fixed value that is limited by local-oscillator shot noise and not by thermal noise.

Figure 1:
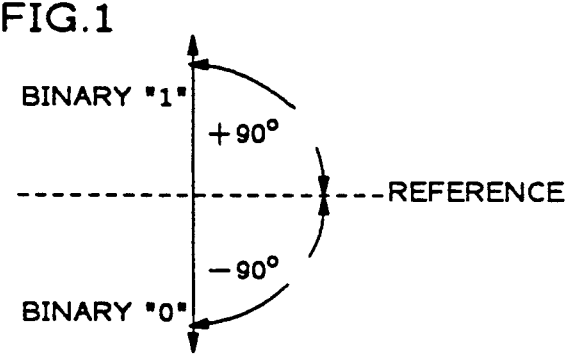
FIG. 1 shows a phasor diagram for phase-shift keyed optical signals.

Among various binary signaling techniques employing single-bit decisions, homodyne detection of BPSK offers the highest sensitivity in theory. Specifically in BPSK homodyne detection, the information is encoded in phase shifts of an optical signal. For example, as illustrated in FIG. 1, a binary "1" may be represented by a phase shift of positive 90 degrees while a "0" may be represented by a phase shift of negative 90 degrees.

Figure 2:
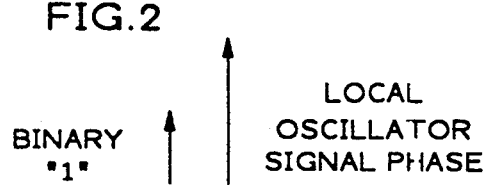
FIG. 2 shows the relative phase of a local oscillator signal with respect to a received binary phase-shift keyed optical signals.

Additionally, the local oscillator signal and the received optical signal must be locked in a fixed phase relationship for optimum detection. Normally, the phase relationship is such that the local oscillator is in phase with one set of symbols (e.g., the "1"'s) and out of phase with the other set (e.g., the "0"'s), as shown in FIG. 2. Under such conditions, the local oscillator signal interferes constructively with the "1"'s and destructively with the "0"'s, resulting in an intensity modulation of an optical beat signal between the received optical signal and the local oscillator signal. It is this intensity modulation that is directly detected by photodetectors for extracting the data signal.

Difficulties in implementing homodyne detection stem from the need to lock the local oscillator signal in a fixed phase relationship with the received optical signal. It should be noted that successful locking is predicated upon having low phase noise (i.e., narrow linewidths) in the lasers generating the local oscillator and received optical signals so that the free-running optical phase between them does not vary significantly except on a time scale of many bit periods. The most practical means for locking the phase is a linear optical phase-locked loop. See, D. J. Malyon, *Electron Lett.*, Vol. 20 pp. 282-3 (1984). As compared to nonlinear loops, a linear optical phase-locked loop avoids the need for multiple optical receivers and for 90° hybrid couplers that have undesirably high sensitivity to signal polarization.

Figure 3:
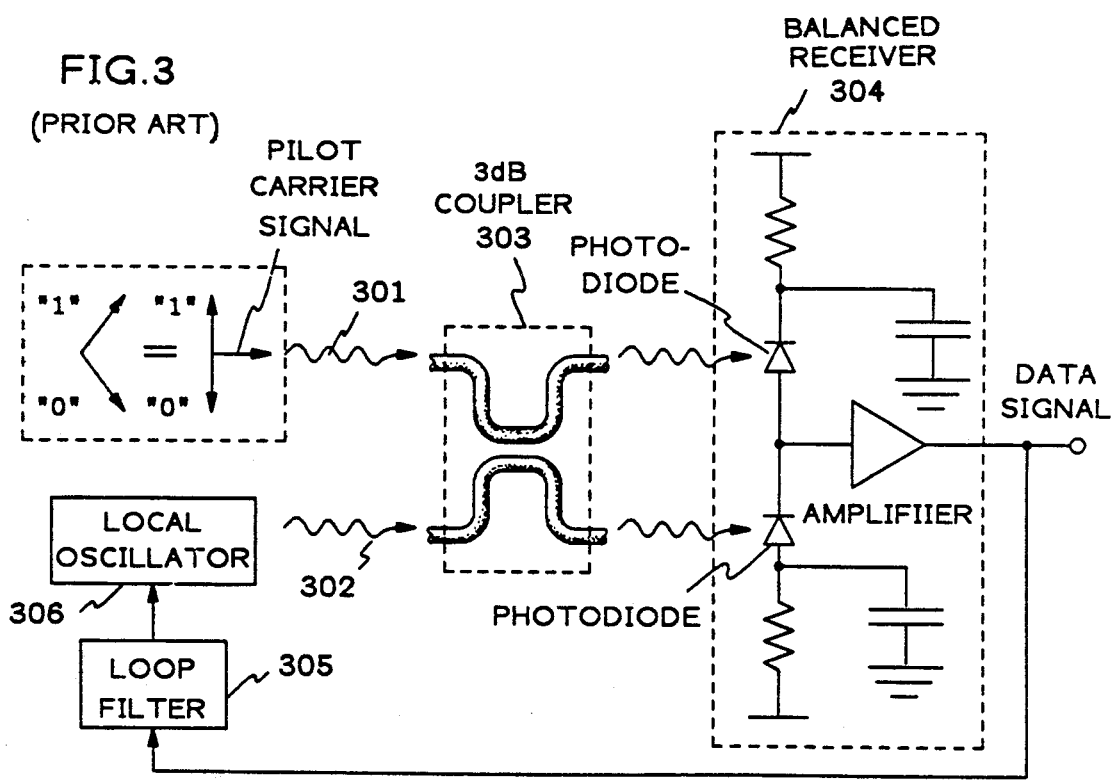
FIG. 3 shows a block diagram of an optical homodyne receiver based on a linear phase-locked loop.

Illustrated in FIG. 3, is a homodyne receiver utilizing a linear optical phase-locked loop with a balanced receiver. With a linear loop configuration, the received optical signal contains a BPSK signal and a residual carrier (pilot carrier signal). In practice, this is achieved by an incomplete phase modulation using a phase shift of less than 180°. Received optical signal 301 is combined with local oscillator signal 302 in 3 dB directional coupler 303. Furthermore, the combined optical signal is detected by balanced receiver 304 having output signal 307 proportional to the cosine of the phase difference between the pilot carrier signal and local oscillator signal 302. A portion of output signal 307 is processed using loop filter 305, such as an integrator, and fed back to frequency-modulate local oscillator 306. In operation, the optical phase-locked loop averages out the fast modulation and ideally only senses the phase relationship between the local oscillator signal and the pilot carrier signal. Driving the cosine of this phase difference to zero, the local oscillator signal is locked in quadrature (90° out of phase) to the pilot carrier signal. Accordingly, the local oscillator signal is locked in the proper phase relationship for efficient detection. That is, local oscillator signal 302 is in phase with the "1"'s and out of phase with the "0"'s. For a more detailed discussion of BPSK homodyne detection, see L. G. Kazovsky, *Journal of Lightwave Technology*, Vol. LT-4, No. 2, pp. 182-95 (1986).

An optical receiver for use in an optical phase-locked loop with a pilot carrier BPSK modulated optical signal must fulfill two functions. First, it must provide a phase error signal (relative phase difference component) for the optical phase-locked loop. Generally, a phase detector response must extend from dc to a frequency approximately 1000 times the combined linewidth of the transmitter and local oscillator laser. Further, the phase detector must exhibit low thermal noise since the pilot carrier signal is typically only 10% of the received optical signal. Second, the receiver must be able to amplify the intensity-modulated received optical signal. The amplifier for the data component must exhibit a wide-band frequency response as well as low thermal noise in order to approach shot-noise limited operation with the available local oscillator signal power.

Figure 4:
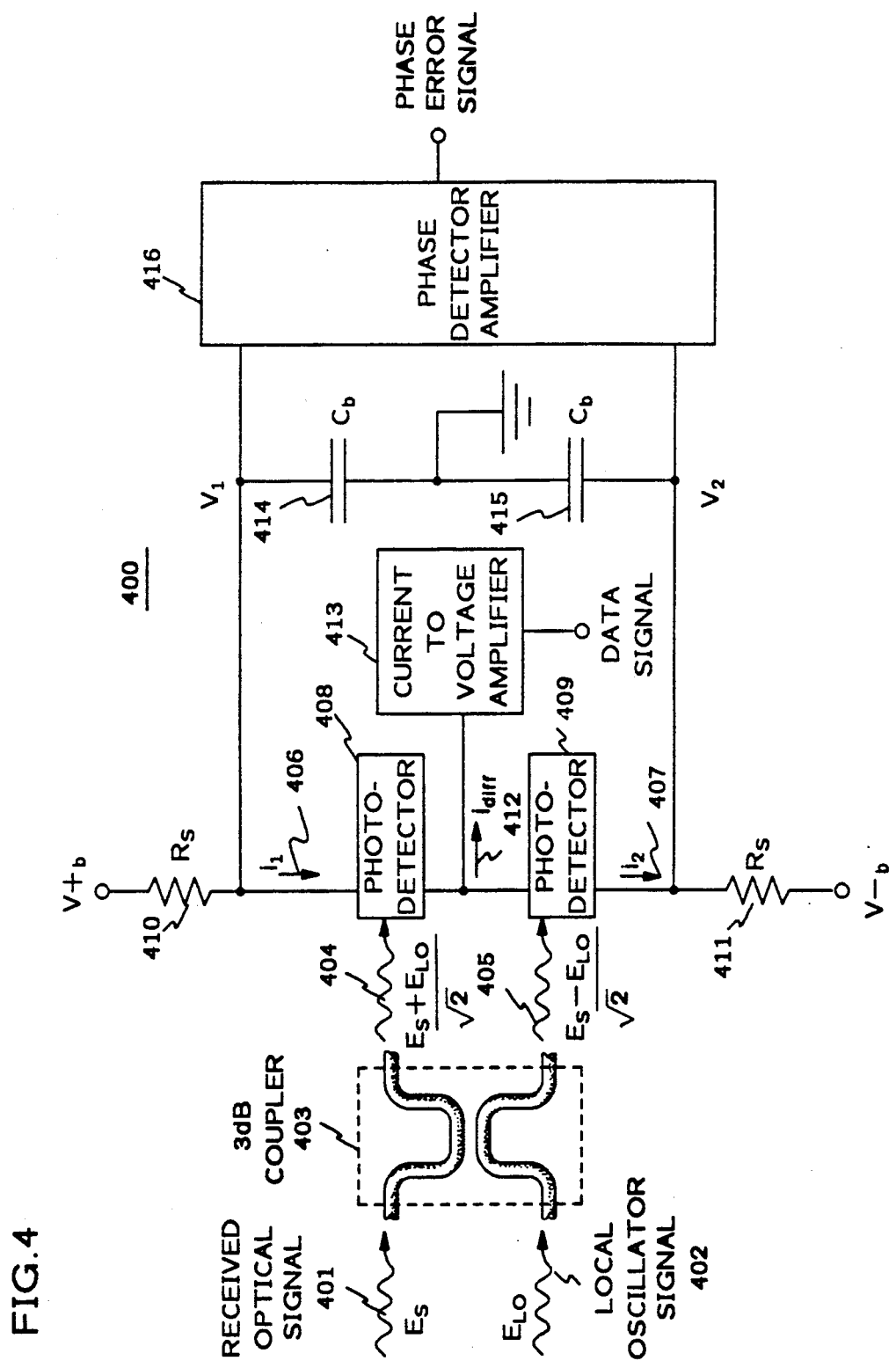
FIGS. 4-6 show exemplary embodiments of an optical receiver in accordance with the principles of the invention.

Shown in FIG. 4 is exemplary BPSK homodyne receiver 400 in accordance with the principles of the invention that utilizes two separate amplification signal paths for extracting the relative phase and data components of a received BPSK optical signal. Received optical signal 401 containing BPSK modulated data has electrical field amplitude $E_s$ given by:

$$E_s = \sqrt{P_s} e^{j\phi_s} \quad (1)$$

where $P_s$ and $\phi_s$ are the received signal power and phase, respectively. Additionally, local oscillator signal 402 has an electric field amplitude $E_{lo}$ given by:

$$E_{lo} = \sqrt{P_{lo}} e^{j\phi_{lo}} \quad (2)$$

where $P_{lo}$ and $\phi_{lo}$ are the local oscillator power and phase, respectively. Received optical signal 401 and local oscillator signal 402 are combined by 3 dB coupler 403, which produces output signals 404 and 405. Output signals 404 and 405 are linear combinations of local oscillator signal 402 and received optical signal 401. Specifically, output signals 404 and 405 are given by:

$$\frac{(E_s + E_{lo})}{\sqrt{2}} \text{ and } \frac{(E_s - E_{lo})}{\sqrt{2}}.$$

illuminating photodetectors 408 and 409, respectively. With local oscillator signal 402 and optical signal 401 operating at the same frequency, photodetector currents 406 ($i_1$) and 407 ($i_2$) are given by the following relationships:

$$i_1 = \frac{\eta e \lambda}{hc} \left\{ \frac{P_s + P_{lo}}{2} + \sqrt{P_s P_{lo}} \cos(\phi_s - \phi_{lo}) \right\} \quad (3)$$

$$i_2 = \frac{\eta e \lambda}{hc} \left\{ \frac{P_s + P_{lo}}{2} - \sqrt{P_s P_{lo}} \cos(\phi_s - \phi_{lo}) \right\} \quad (4)$$

where $\eta$ is the detector quantum efficiency, $\lambda$ is the wavelenght, h is Planck's constant, and c is the speed of light. The third term in each of the above equations is relative phase-sensitive current component 412 that flows into a low-impedance data signal path, typically ~50-5000 Ω, provided by wide-band current-to-voltage amplifier 413 for extracting the data component signal of received optical signal 401. Is should be noted that amplifier 413 extracts the data component signal of received optical 401 between photodetectors 408 and 409. Furthermore, current 412 ($i_{diff}$) is given by:

$$i_{diff} = \frac{2\eta e \lambda}{hc} \sqrt{P_s P_{lo}} \cos(\phi_s - \phi_{lo}) \quad (5)$$

Amplifier 413 may be of a transimpedance design, or a high-impedance design, in which case it will be followed by an appropriate equalizer. Typically, amplifier 413 should have a frequency response from about $10^{-5}$ of the signaling bit-rate to at least 0.7 of the bit-rate. Bypass capacitors 414 ($C_b$) and 415 ($C_b$) are chosen such that the high-frequency response of amplifier 413 is not limited by the need to charge and discharge the parasitic capacitances of photodetectors 408 and 409 through bias resistors 410 ($R_s$) and 411 ($R_s$), respectively. Bias voltages $V^+{}_b$ and $V^-{}_b$ have been adjusted for a sufficient bias voltage to exist across the photodetectors, for high-speed operation, even after accounting for the voltage drop across resistors 410 and 411. Furthermore, while resistors 410 and 411 are in series with photodetectors 408 and 409, these resistors do not substantially affect the frequency response of amplifier 413 because their value is chosen to be much lower than the output resistances of photodetectors 408 and 409.

It is should be noted that phase detector amplifier 416 extracts the relative phase component from opposing ends of photodetectors 408 and 409, which are at an ac ground with respect to amplifier 413. Moreover, it is desired that phase detector 416 have a high input impedance. Phase detector 416 senses voltages $V_1$ and $V_2$ given by $V_b - i_1 R_s$ and $-V_b + i_2 R_s$, respectively. and extracts from voltages $V_1$ and $V_2$, which are time-dependent, the relative phase-sensitive signal while rejecting the phase-insensitive components of $V_1$ and $V_2$. These phase-insensitive components depend upon the detectors biases and the voltage drop across resistors 410 and 411 caused by the photocurrent generated by detected local oscillator signal 420. Phase detector 416 extracts the relative phase-sensitive signal by functioning as a summing voltage amplifier, yielding an output voltage proportional to $V_1 + V_2$. Additionally, phase detector 416 extracts the relative phase information without affecting the operation of amplifier 413 under the following conditions. First, photodetectors 408 and 409 have high output resistance so that placing resistors 410 and 411 in series therewith does not affect the photocurrent produced. Second, the bandwidth required for phase detector 416 be much less than that required by converting amplifier 413. Third, photodetectors 408 and 409 have small parasitic capacitances and require only small bypass capacitors 414 and 415 to assure good frequency response of amplifier 413. Capacitors 414 and 415 can thus be small enough such that phase detector 416 has sufficient bandwidth.

Figure 5:
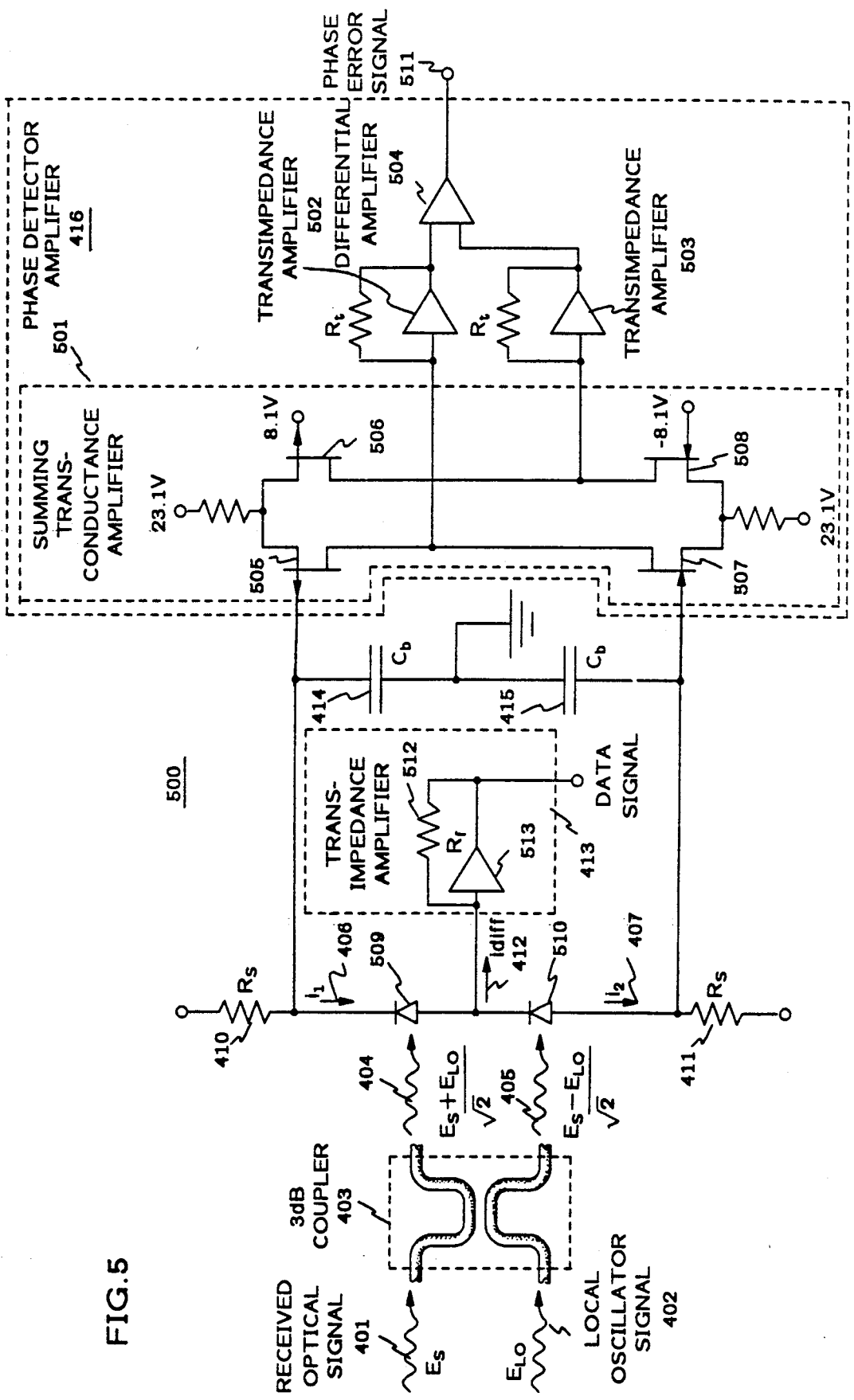

In an example from experimental practice, balanced p-i-n FET receiver 500 in accordance with the principles of the invention discussed herein above was used to phase-lock a local oscillator signal to a 295 pW pilot carrier signal with 8° rms phase error. The pilot carrier signal as well as the local oscillator signal was generated using 1.51 μm semiconductor lasers. Referring to FIG. 5, receiver 500 contained 75 μm diameter, planar GaInAs p-i-n photodiodes 509 and 510, which were illuminated by optical signals 404, $$\left(\frac{E_s + E_{lo}}{\sqrt{2}}\right) \text{ and } 405 \left(\frac{E_s - E_{lo}}{\sqrt{2}}\right),$$

respectively, via 3 dB coupler 403. The data component signal of received optical signal 401 was extracted by amplifier 413. Specifically, amplifier 413 was a 330 Ω transimpedance amplifier having a total input capacitance of 0.8 pF. The transimpedance amplifier employed high electron mobility transistors and metal-semiconductor field-effect transistors (MESFET's) with multiple stages of electronic gain, which were internally ac-coupled. Capacitors 414 ($C_b$=10 pF) and 415 ($C_b$=10 pF) bypassed photodiodes 509 and 510 to ground. In addition, phase detector amplifier 416 extracted its signal from resistors 410 ($R_s$=5.1 kΩ) and 411 ($R_s$32 5.1 kΩ), which are placed in series with the bias of each photodiode. The signal from each resistor was amplified by summing transconductance amplifier 501 containing differential junction field-effect transistor pairs 505, 506 and 507, 508, all four having matched transconductance, $g_m$ and matched drain current characteristics. The following stages consisted of dc-20 MHz transimpedance amplifiers 502 and 503 and dc-20 MHz differential amplifier 504.

Each differential transistor pair 505, 506 and 507, 508 is biased so that when photodiodes 509 and 510 detect only a dc photocurrent generated by local oscillator signal 402, then transistors 505 and 506 have the same drain current and, moreover, this current is equal to the drain current in transistors 507 and 508. As such, no current flows into transimpedance amplifiers 502 and 503. However, when currents 406 ($i_1$) and 407 ($i_2$) contain non-zero phase-sensitive components, then differential transistor pairs 505, 506 and 507, 508 become unbalanced and a positive current flows into one transimpedance amplifier and negative current into the other transimpedance amplifier. The outputs of transimpedance amplifiers 502 and 503 are subtracted in differential amplifier 504.

In this specific case, the low frequency response and output signal 511 ($V_{out}$) of phase detector 416 were given by:

$$K_d\left(\frac{V}{\text{rad}}\right) = \frac{2\eta e \lambda}{hc} \sqrt{P_s P_{lo}} \ R_s g_m R_t A_d \tag{6}$$

$$V_{out} = K_d \cos(\phi_s - \phi_{lo}) \tag{7}$$

where $\eta = 0.78$, $\lambda = 1.51$ μm, $P_s = 295$ pW, $P_{lo} = 695$ μW, $g_m = 2.43$ mmho, and $A_d$ is the gain of differential amplifier 504. Here, $\eta$ is the quantum efficiency of photodiodes 509 and 510, $\lambda$ is operating wavelength of optical signal 401, and $g_m$ is the transconductance of junction field-effect transistors 505, 506, 507 and 508. Accordingly, the phase detector gain factor, $K_d$, is 98 mV/rad. In addition, phase detector 416 has its first pole at a frequency, $f_p$, given by $1/[2\pi R_s(C_b + C_i)]$, where $C_i = 4$ pF is the junction field-effect transistor input capacitance.

The amplitude response of amplifier 413 was measured using an intensity-modulated optical signal introduced into one input of 3 dB coupler 403, and normalized to the response of a p-i-n detector, which had a 3 dB bandwidth of 15 GHz. With only one detector illuminated, the differential response exhibited a 3 dB bandwidth of 3.4 GHz with substantial response up to 8 GHz. Additionally, with both detectors 509 and 510 illuminated, the common-mode response exhibited excellent rejection up to 5 GHz.

The low-frequency thermal-noise density of amplifier 413 was 9.2pA/√(Hz), compared with the 7.1pA/√(Hz) Johnson noise of feedback resistor 512 ($R_f$). Analogous measurements for phase detector 416 indicated a differential response exhibiting a 3 dB bandwidth of 2.2 MHz with a substantially small common-mode response. In addition, the thermal-noise density of 2.7pA/√(Hz) measured was close to the 2.5pA/√(Hz)

expected from bias resistors 410 and 411. When receiver 500 was illuminated with a total local oscillator power, $P_{lo} = 695$ µW and no received optical signal, phase detector 416 exhibited a total output drift during 5 minutes of 10 mV or 6° phase drift.

The operation of phase detector 416 was tested using a second-order optical phase-lock loop (not shown) with the following loop parameters: $\omega_n = 590$ krad/s, $\rho = 0.72$, $B_l$ 320 kHz and $K_v = 1.3 \times 10^9$, where $\omega_n$ is natural frequency, $\rho$ is the damping coefficient, $B_l$ is the noise bandwidth and $K_v$ is dc loop gain. The significance of these parameters is discussed, for example, in the book, "Phaselock Techniques" by F. M. Gardner (1979). Locking was observed for periods of up to 30 minutes, limited by drift of the phase detector balance. Furthermore, integration of the phase error density yield an rms phase error of 8°.

Figure 6:
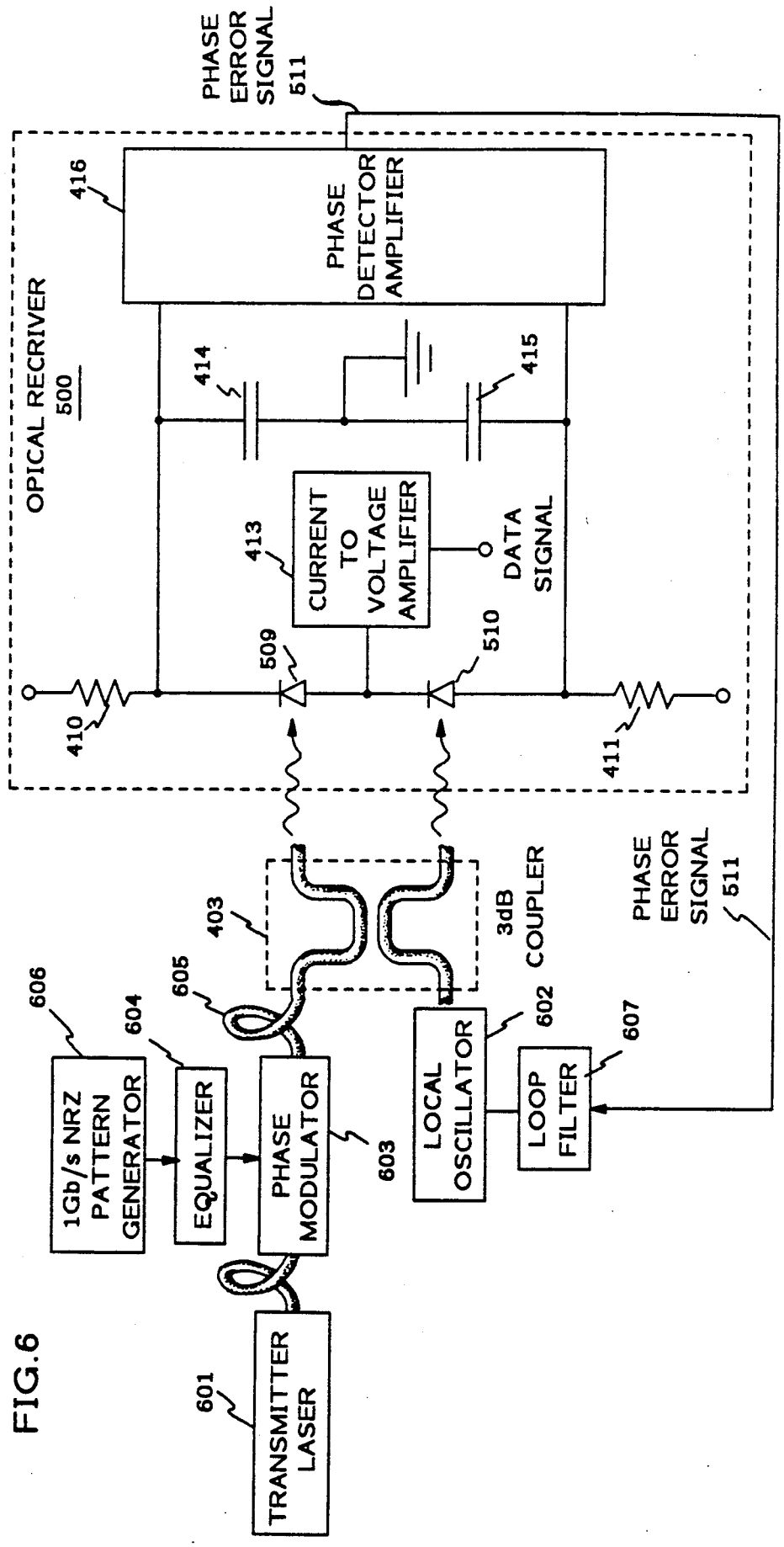

In another example from experimental practice, optical receiver 500 is utilized for homodyne detection of 1 Gbit/s pilot-carrier BPSK optical signal. As illustrated in FIG. 6, transmitter 601 and local oscillator 602 are 1.508 µm InGaAsP external-cavity lasers which have a beat linewidth of 3 kHz. In addition, transmitter 601 and local oscillator 602 each contains two-electrode chips to allow fast frequency modulation and, moreover, are protected from reflective feedback using Faraday isolators not shown. Phase modulator 603 is fiber pigtailed, X-cut, traveling-wave LiNbO$_3$ phase modulator, which requires 9 volts to produce a 180° phase shift. Passive equalizer 604 equalizes the frequency response of phase modulator 603. For transmission of a BPSK optical signal, the modulation angle is adjusted to ±69°, leaving a pilot carrier signal containing 13% of the transmitted power. At the output of modulator 603, the launched output power is ~ −1 dBm.

Optical signals from phase modulator 603, generated by pattern generator 606, are transmitted through 209 km fiber 605, which has a loss of 50.7 dB and an estimated dispersion of 2.9 ns/nm. The combined signal and local oscillator signal illuminates balanced p-i-n FET receiver 500, which contains two signal amplification paths for extracting the data and relative phase signal components. Amplifier 413 coherently demodulates a received optical signal, while phase detector amplifier 416 extracts the relative phase information from sensor resistors 410 and 411 placed in series with p-i-n detector 509 and 510. The detected local oscillator signal (1.1 ma of photocurrent) gives rise to a combined shot and thermal noise power which is 6.2 dB above the thermal noise of amplifier 413. Correspondingly, the local oscillator signal yields a combined shot and thermal noise 16.4 dB above the thermal noise of phase detector 416. Phase detector 416 output is processed by loop filter 607, a lag-lead integrator, and phase signal 511 resistively added with a dc current to the low-biased electrode of local oscillator 602. Amplifier 413 directly yields a baseband data signal.

For the second-order optical phase-lock loop, the following parameters were $\omega_n = 600$ krad/s, $\rho = 0.71$, $B_l = 320$ kHz, and $K_v = 5.5 \times 10^9 s^{-1}$. After 209 km fiber transmission of a $2^{15} - 1$ pseudo-random binary sequence, the sensitivity was −52.2 dBm or 46 photons/bit. Compared to the quantum limit of 9 photons/bit or −59.3 dBm, these results are 7.1 dBm worse. A penalty of 1.2 dB resulted from incomplete suppression of the thermal noise of amplifier 413. In addition, coupling losses caused a 0.6 dB penalty and pilot-carrier transmission represented a 0.6 dB penalty. It is also estimated that a penalty of 1.5 dB resulted from crosstalk in which the optical phase-locked loop tracked the low-frequency components of the BPSK data signal.

We claim:

1. An optical homodyne receiver comprising:
   first and second photodetectors responsive to first and second optical signals, respectively, said first photodetector connected between first and second terminals, said second photodetector connected between a third terminal and said second terminal, said first optical signal comprising the electrical-field sum of a local oscillator signal and a received optical signal, and said second optical signal comprising the electrical-field difference between said local oscillator signal and said received optical signal;
   means, for detecting a data component of said received optical signal, electrically connected to said second terminal; and
   means, for detecting the relative phase difference between said received optical signal and said local oscillator signal, electrically connected across said first and third terminals.

2. The optical homodyne receiver as defined in claim 1 further comprising
   first and second capacitance means for electrically bypassing said first and third terminals, so that said first and third terminals are substantially at an ac ground with respect to said second terminal.

3. The optical homodyne receiver as defined in claim 2 further comprising first and second means for biasing said first and second photodetectors, respectively, so that said first and second means produce first and second voltages proportional to photocurrents induced by said first and second optical signals, respectively.

4. The optical homodyne receiver as defined in claim 3 wherein said means for detecting said relative phase difference includes a summing voltage amplifier responsive to said first and second voltages.

5. The optical homodyne receiver as defined in claim 4 wherein said means for detecting said data component includes a current-to-voltage amplifier.

6. The optical homodyne receiver as defined in claim 5 further comprising an optical means for linearly combining said received optical signal and said local oscillator signal to produce said first and second optical signals.

7. The optical homodyne receiver as defined in claim 6 further comprising a local oscillator laser, for generating said local oscillator signal, responsive to a feedback signal to vary the phase of said local oscillator signal.

8. The optical homodyne receiver as defined in claim 7 further comprising filter means, responsive to an output of said phase detector amplifier, for generating said feedback signal so that said relative phase difference has a predetermined value.

9. An optical communication system comprising an optical transmitter, an optical homodyne receiver and a transmission medium optically coupled jointly to said optical transmitter and said optical homodyne receiver for supporting a received optical signal therebetween, said optical homodyne receiver comprising:
   an optical means for linearly combining said received optical signal and a local oscillator signal to produce first and second optical signals, said first optical signal comprising the electrical-field sum of a local oscillator signal and said received optical signal, said second optical signal comprising the electrical-field difference between said local oscillator signal and said received optical signal;

first and second photodetectors responsive to first and second optical signals, respectively, said first photodetector electrically connected between first and second terminals, said second photodetector connected between a third terminal and said second terminal;

means, for detecting a data component of said received optical signal, electrically connected to said second terminal;

means, for detecting the relative phase difference between said received optical signal and said local oscillator signal, electrically connected across said first and third terminal.

10. The optical communication system as defined in claim 9 wherein said optical homodyne receiver further comprises first and second capacitance means electrically bypassing said first and third terminals so that said first and third terminals are substantially at an ac ground with respect to said second terminal.

11. The optical communication system as defined in claim 10 wherein said optical homodyne receiver further comprises first and second means for biasing said first and second photodetectors, respectively, so that said first and second means produce first and second voltages proportional to photocurrents induced by said first and second optical signals, respectively.

12. The optical communication system as defined in claim 11 wherein said means for detecting said relative phase difference includes a summing voltage amplifier responsive to said first and second voltages.

13. The optical communication system as defined in claim 12 wherein said means for detecting said data component includes a current-to-voltage amplifier.

14. The optical communication system as defined in claim 13 wherein said optical homodyne receiver further comprises an optical means for linearly combining said received optical signal and said local oscillator signal to produce said first and second optical signals.

15. The optical communication system as defined in claim 14 wherein said optical homodyne receiver further comprises a local oscillator laser, for generating said local oscillator signal, responsive to a feedback signal to vary the phase of said local oscillator signal.

16. The optical communication system as defined in claim 15 wherein said optical homodyne receiver further comprises filter means, responsive to an output of said phase detector amplifier, for generating said feedback signal so that said relative phase difference has a predetermined value.

* * * * *